United States Patent
Riddiford (10) Patent No.: US 9,064,104 B2
(45) Date of Patent: Jun. 23, 2015

(54) GRAPHICAL AUTHENTICATION

(75) Inventor: Martin Riddiford, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 937 days.

(21) Appl. No.: 12/815,763

(22) Filed: Jun. 15, 2010

(65) Prior Publication Data

US 2010/0322485 A1     Dec. 23, 2010

(30) Foreign Application Priority Data

Jun. 18, 2009  (GB) .................................. 0910545.3
Jul. 10, 2009  (GB) .................................. 0912008.0

(51) Int. Cl.
| | | |
|---|---|---|
| G06K 9/00 | (2006.01) | |
| G06K 9/36 | (2006.01) | |
| G06K 9/32 | (2006.01) | |
| G06F 7/04 | (2006.01) | |
| G06F 17/30 | (2006.01) | |
| G06F 21/36 | (2013.01) | |
| H04N 7/16 | (2011.01) | |

(52) U.S. Cl.
CPC ...................................... *G06F 21/36* (2013.01)

(58) Field of Classification Search
USPC .................. 382/100, 115, 287, 294
See application file for complete search history.

(56) References Cited

U.S. PATENT DOCUMENTS

| | | | |
|---|---|---|---|
| 5,559,961 A * | 9/1996 | Blonder .......................... | 726/18 |
| 5,699,514 A | 12/1997 | Durinovic-Johri et al. | |
| 5,821,933 A * | 10/1998 | Keller et al. ................... | 715/741 |
| 6,118,872 A | 9/2000 | Kashima et al. | |
| 6,209,104 B1 * | 3/2001 | Jalili ............................... | 726/18 |
| 6,686,931 B1 | 2/2004 | Bodnar | |
| 6,862,687 B1 * | 3/2005 | Suzuki ............................ | 726/18 |
| 6,950,949 B1 | 9/2005 | Gilchrist | |
| 7,124,433 B2 * | 10/2006 | Little ............................... | 726/2 |
| 7,240,367 B2 | 7/2007 | Park | |
| 7,376,899 B2 | 5/2008 | Mantyla | |
| 7,453,443 B2 | 11/2008 | Rytivaara et al. | |
| 7,659,869 B1 | 2/2010 | Bauchot et al. | |
| 7,720,307 B2 | 5/2010 | Iizuka | |
| RE41,922 E | 11/2010 | Gough et al. | |
| 7,992,202 B2 | 8/2011 | Won et al. | |
| 8,111,134 B2 * | 2/2012 | Faith et al. .................... | 340/5.81 |
| 8,229,250 B2 * | 7/2012 | Suzuki et al. ................. | 382/294 |

(Continued)

FOREIGN PATENT DOCUMENTS

| | | |
|---|---|---|
| CN | 1547688 A | 11/2004 |
| CN | 101282217 A | 10/2008 |

(Continued)

OTHER PUBLICATIONS

International Search Report for PCT/GB2010/001172, dated Sep. 15, 2010, 4 pages.

(Continued)

*Primary Examiner* — Matthew Bella
*Assistant Examiner* — Jose M Torres
(74) *Attorney, Agent, or Firm* — Fish & Richardson P.C.

(57) ABSTRACT

A method includes displaying a base image and a secondary image overlying the base image on a display, detecting an alignment of a first element of the base image with a second element of the secondary image, and when the first element and the second element are pre-selected elements for a user, authenticating the user.

39 Claims, 5 Drawing Sheets

(56) References Cited

U.S. PATENT DOCUMENTS

| | | | |
|---|---|---|---|
| 8,458,485 B2* | 6/2013 | Bandyopadhyay et al. | 713/184 |
| 8,483,518 B2 | 7/2013 | Zhu et al. | |
| 2002/0029341 A1 | 3/2002 | Juels et al. | |
| 2003/0193512 A1* | 10/2003 | Komagata | 345/629 |
| 2004/0004616 A1 | 1/2004 | Konya et al. | |
| 2004/0010721 A1 | 1/2004 | Kirovski et al. | |
| 2004/0010722 A1 | 1/2004 | Ha | |
| 2004/0030933 A1 | 2/2004 | Park | |
| 2005/0201638 A1 | 9/2005 | Cha | |
| 2005/0251752 A1 | 11/2005 | Tan et al. | |
| 2006/0206717 A1 | 9/2006 | Holt et al. | |
| 2006/0206919 A1 | 9/2006 | Montgomery et al. | |
| 2006/0238517 A1 | 10/2006 | King et al. | |
| 2007/0150842 A1 | 6/2007 | Chaudhri et al. | |
| 2007/0250934 A1 | 10/2007 | Park | |
| 2007/0277224 A1 | 11/2007 | Osborn et al. | |
| 2008/0060052 A1 | 3/2008 | Hwang et al. | |
| 2008/0092245 A1 | 4/2008 | Alward et al. | |
| 2008/0113791 A1 | 5/2008 | Williams et al. | |
| 2008/0127302 A1 | 5/2008 | Qvarfordt et al. | |
| 2008/0165153 A1 | 7/2008 | Platzer et al. | |
| 2008/0201578 A1 | 8/2008 | Drake | |
| 2008/0209223 A1 | 8/2008 | Nandy et al. | |
| 2008/0244700 A1 | 10/2008 | Osborn et al. | |
| 2009/0012880 A1 | 1/2009 | Tortola | |
| 2009/0037986 A1 | 2/2009 | Baker | |
| 2009/0038006 A1 | 2/2009 | Traenkenschuh et al. | |
| 2009/0046856 A1 | 2/2009 | Mitchell | |
| 2009/0046929 A1 | 2/2009 | De Leon | |
| 2009/0077653 A1 | 3/2009 | Osborn et al. | |
| 2009/0138723 A1 | 5/2009 | Nyang et al. | |
| 2009/0160800 A1 | 6/2009 | Liu et al. | |
| 2009/0187986 A1 | 7/2009 | Ozeki | |
| 2009/0293119 A1 | 11/2009 | Jonsson | |
| 2009/0300732 A1 | 12/2009 | Hwang et al. | |
| 2009/0313693 A1 | 12/2009 | Rogers | |
| 2009/0320124 A1 | 12/2009 | Taxier et al. | |
| 2009/0328175 A1 | 12/2009 | Shuster | |
| 2010/0037313 A1 | 2/2010 | Tomeny | |
| 2010/0040293 A1 | 2/2010 | Hermann et al. | |
| 2010/0043062 A1 | 2/2010 | Alexander et al. | |
| 2010/0050242 A1 | 2/2010 | Delia et al. | |
| 2010/0064376 A1 | 3/2010 | Vladimirovitch et al. | |
| 2010/0102941 A1 | 4/2010 | Richter et al. | |
| 2010/0107067 A1 | 4/2010 | Vaisanen | |
| 2010/0169958 A1 | 7/2010 | Werner et al. | |
| 2010/0180336 A1 | 7/2010 | Jones et al. | |
| 2010/0205667 A1 | 8/2010 | Anderson et al. | |
| 2010/0287382 A1 | 11/2010 | Gyorffy et al. | |
| 2010/0322485 A1 | 12/2010 | Riddiford | |
| 2010/0333198 A1 | 12/2010 | Mikake | |
| 2011/0096997 A1 | 4/2011 | Marciszko et al. | |
| 2011/0202982 A1 | 8/2011 | Alexander et al. | |
| 2011/0289576 A1 | 11/2011 | Cheng | |
| 2012/0011564 A1 | 1/2012 | Osborn et al. | |
| 2012/0023574 A1 | 1/2012 | Osborn et al. | |
| 2012/0167199 A1 | 6/2012 | Riddiford | |
| 2012/0291120 A1 | 11/2012 | Griffin | |

FOREIGN PATENT DOCUMENTS

| | | |
|---|---|---|
| CN | 102804195 A | 11/2012 |
| EP | 0677801 A1 | 10/1995 |
| EP | 901060 A2 | 3/1999 |
| EP | 1422589 A1 | 5/2004 |
| EP | 1845474 | 10/2007 |
| EP | 2000939 A2 | 12/2008 |
| EP | 2254071 A1 | 11/2010 |
| JP | 2001092785 A | 4/2001 |
| TW | I268690 | 4/2005 |
| WO | 0198924 A1 | 12/2001 |
| WO | 0199338 A1 | 12/2001 |
| WO | 03048909 A2 | 6/2003 |
| WO | 2004027632 A1 | 4/2004 |
| WO | 2005029216 A2 | 3/2005 |
| WO | 2006073313 A1 | 7/2006 |
| WO | 2007098569 A1 | 9/2007 |
| WO | 2008124708 A2 | 10/2008 |
| WO | 2008132724 | 11/2008 |
| WO | 2009150655 A1 | 12/2009 |

OTHER PUBLICATIONS

Written Opinion for PCT/GB2010/001172, dated Sep. 15, 2010, 4 pages.
International Search Report for PCT/GB2010/001173, dated Sep. 16, 2010, 4 pages.
Written Opinion for PCT/GB2010/001173, dated Sep. 16, 2010, 5 pages.
Office Action issued in corresponding UK Application No. GB0912008.0 dated Feb. 2, 2012; 4 pages.
Hoanca et al.; Screen oriented technique for reducing the incidence of shoulder surfing; Proceedings of International Conference of Security of Information and Networks; 2005; Citeseer; pp. 1-7.
Non-Final Office Action mailed Nov. 20, 2012, in corresponding U.S. Appl. No. 12/969,647; 11 pages.
Non-Final Office Action mailed Oct. 3, 2012, in corresponding U.S. Appl. No. 12/969,646; 16 pages.
Non-Final Office Action mailed Oct. 10, 2012, in corresponding U.S. Appl. No. 12/969,797; 17 pages.
Non-Final Office Action mailed Sep. 4, 2012, in corresponding U.S. Appl. No. 12/969,645; 29 pages.
Non-Final Office Action mailed Aug. 14, 2012, in corresponding U.S. Appl. No. 12/969,640; 18 pages.
Notice of Allowance mailed Nov. 9, 2012, in corresponding U.S. Appl. No. 12/969,638; 15 pages.
Non-Final Office Action mailed Aug. 27, 2012, in corresponding U.S. Appl. No. 12/969,633; 17 pages.
Examination Report mailed Feb. 2, 2012, in corresponding Great Britain Patent Application No. GB0912008.0; 7 pages.
Examination Report mailed Aug. 2, 2012, in corresponding Great Britain Patent Application No. GB0912008.0; 7 pages.
Non-Final Office Action mailed Dec. 12, 2012, in corresponding U.S. Appl. No. 12/969,637; 11 pages.
Sobrado & Birget, "Shoulder-Surfing resistant graphical passwords—Draft" New Jersey, USA; Apr. 11, 2005 pp. 1-8.
Kim, David et al., Multi-Touch Authentication on Tabletops:http://homepages.cs.ncl.ac.uk/david.kim/multi-touch_authentication;online; printed Mar. 10, 2011, 6 pages.
Tan et al., Spy-Resistant keyboard: More Secure Password Entry on Public Touch Screen Displays; Microsoft Research; published 2005; 10 pages.
Sobrado, L. et al., "Graphical Passwords", 2002, The Rutgers Scholar: An Electronic Bulletin of Undergraduate Research; http://rutgersscholar.rutgers.edu/volume04/sobrbirg/sobrbirg.htm; vol. 4, pp. 1-10; published 2002 and retrieved on Mar. 19, 2013.
English abstract for JP2001092785; published on Apr. 6, 2001 and retrieved on Sep. 6, 2011.
Office Action mailed Jun. 20, 2013, in corresponding Taiwan patent application No. 099119542.
English translation of Office Action mailed Jun. 20, 2013, in corresponding Taiwan patent application No. 099119542.
Office Action mailed Sep. 4, 2013, in corresponding Canadian Patent Application No. 2,760,826.
Office Action mailed Sep. 4, 2013, in corresponding Canadian Patent Application No. 2,760,337.
Office Action for Canadian Patent Application No. 2,775,859 dated Nov. 12, 2013.
Non-Final Office mailed Mar. 28, 2014; in corresponding U.S. Appl. No. 12/696,640.
Gossweiler et al., "What's up CAPTCHA? A CAPTCHA Based on Image Orientation", Proceedings of the 18th International Conference on World Wide Web, Apr. 20, 2009, pp. 841-850, ACM, New York, NY, USA.
Office Action mailed Mar. 5, 2014; in corresponding Canadian patent application No. 2,760,826.

(56) References Cited

OTHER PUBLICATIONS

Al-Baker et al., "A GPRS-based remote human face identification system for handheld devices", Second IFIP International Conference on Wireless and Optical Communications Networks, pp. 367-371, Mar. 6-8, 2005.

Office Action mailed Mar. 31, 2014; in corresponding Canadian patent application No. 2,760,337.

Feng et al., "Recognition of head-and-shoulder face image using virtual frontal-view image", IEEE Transactions on Systems, Man, and Cybernetics, Part A:Systems and Humans, vol. 30, No. 6, pp. 871-883, Nov. 2000.

SIPO, Office Action in Chinese patent application No. 201080036587.1, Jul. 2, 2014.

English translation of SIPO, Office Action in Chinese patent application No. 201080036587.1, Jul. 2, 2014.

SIPO, Office Action in Chinese patent application No. 201080036589.0, Jun. 30, 2014.

English translation of tSIPO, Office Action in Chinese patent application No. 201080036589.0, Jun. 30, 2014.

English abstract for CN1547688; published on Nov. 17, 2004 and retrieved on Oct. 2, 2014.

English abstract for CN101282217; published on Oct. 8, 2008 and retrieved on Oct. 2, 2014.

English abstract for CN102804195; published on Nov. 28, 2012 and retrieved on Oct. 2, 2014.

Non-Final Office Action mailed Nov. 5, 2014; in U.S. Appl. No. 13/379,337.

Office Action issued in U.S. Appl. No. 12/969,640 on Jan. 16, 2015; 14 pages.

\* cited by examiner

GRAPHICAL AUTHENTICATION

CROSS-REFERENCE TO RELATED APPLICATIONS

This application claims the benefit of priority under 35 U.S.C. §119 to prior Patent Application No. GB0910545.3, filed Jun. 18, 2009 in the United Kingdom Intellectual Property Office, and Patent Application No. GB0912008.0, filed Jul. 10, 2009 in the United Kingdom Intellectual Property Office, the entire contents of both applications are incorporated herein by reference.

FIELD OF TECHNOLOGY

This disclosure relates to electronic devices, including but not limited to devices with graphical authentication for access.

BACKGROUND

Although most computing devices, including personal computing devices, such as cellular telephones, smart telephones, wireless personal digital assistants (PDAs), personal computers (PCs), laptop computers, and so forth, to name a few, have built in password security, many users choose not to be hassled by initiating password security. Users that initiate password security are often frustrated by password security, and corporate or other entities may insist on changing the password regularly, e.g., every month. Different passwords may be needed for different authentication devices or applications. Remembering all such passwords and selecting the appropriate one may be very onerous.

In practice password systems for computing devices may be breached in several ways, for example: random trial and error, e.g., hitting random keys, where eventually the correct password will be found, but may take a long time; systematic trial and error, e.g., trying 0000, 0001, 0002, and so forth for a PIN number; inspired guesswork, e.g., trying general favorite numbers, for example, 1066, 1234, and so forth, or personal numbers, for example, birthday, telephone number, and so forth; learning the password by surveillance, shoulder surfing, finding the password written down somewhere, and so forth; hacking, e.g., key click measurement, on-line interception, and so forth; forced disclosure to a mugger.

A 4-number PIN has a theoretical security of 1 in 10×10×10×10=1 in 10,000 or 0.0001. Hackers would probably give up if they had the typical three chances at these odds.

In practice, the problem is that users find remembering multiple passwords/numbers to be difficult, and either the user chooses a memorable personal number that is likely to be used widely elsewhere or a non-memorable one that needs to be written down, usually next to the computing device requiring the security. Many instances of surveillance scams to learn passwords have been reported. Looking over someone's shoulder when users are entering their PIN or password is not uncommon. The practical security offered by a PIN number, e.g., from a hacker's or thieves point of view, is quite modest.

DETAILED DESCRIPTION

A computing device includes a graphical authentication interface or process in which the device displays a base image. In order to be authenticated, the user aligns a pre-selected element present in a secondary image overlying the base image with a pre-selected element of the base image. The graphical authentication effectively utilizes alignment of elements in two images as a password, which is referred to herein as a graphical password. When the user is authenticated, access is provided to the computing device or one or more processes of the computing device.

The method utilizes a user's visual acuity and memory. One can remember thousands of faces, many hundreds of images, and countless views. The natural capacity for memorizing visual details is utilized. In one implementation, a user memorizes an element or location of a familiar image and another visual element and aligns that visual element over, or with, the element or location. The user experience may be improved over conventional PIN or password based systems. The method is also more secure, especially against someone watching a user authenticate using this system.

The method is based on a simple analog alignment task performed on a portable, personal computing device with a screen that may be color and 2-dimensional cursor control or other way of selecting a location on an image and moving an image. This method may take place in a 3D virtual environment with a 3-dimensional controller.

A base image is displayed on the computing device screen, usually fixed in a static position. Although a static base image layer is described, moving or modifying this base image may increase security. For example, the computing device may automatically re-size, re-position, or re-arrange the base image or parts thereof slightly or more significantly each time or substantially each time the base image is displayed to further increase security, e.g., by preventing copying or memorizing of the base image.

This base image is the similar to a desktop or background image, and may be imported, for example, from the user's photos library. A personal picture may be more memorable to the user than a generic sample image. A busy, detailed picture may provide more security. Software running on the computing device may analyse a picture for busyness and score for suitability.

When setting up the authentication process, the user identifies a point of interest in the base image and positions a pointer or cursor over the point of interest, for example, using a mouse or other navigation device and clicks or selects the point of interest to confirm and set up the point of interest on the base image. Other navigation devices that may be utilized include a trackpad, ISO point, trackball, touchscreen, tilt/gesture/shake control, cursor, keys, and so forth. In computing devices having a touchscreen or touch-sensitive navigation device, when no cursor is present, a user may select the point of interest by touching it. Optionally, two or more points of interest may be selected for authentication.

The size of the authentication area for the point of interest or target is inversely proportional to the level of security. The authentication area may be adjustable, e.g., size and/or shape, and may be adjustable by user entry or calculation, e.g., based on characteristics such as the size/resolution of the display and/or the base image or secondary image. Once confirmed, the authentication area is activated. A secondary image appears and overlays the base image. Two layers, or overlaid images, are utilized with x and y cursor control of the relative position of each layer, or a touch-to-drag of the secondary image. Three or more, images or layers may be utilized for a greater number of permutations and hence more security.

This secondary image, which may be the top or upper image or layer, is transparent or translucent except for an array of elements arranged in, for example, a regular pattern or grid. The elements may be numbers, letters, words, colors, shapes, lines, icons, images, and so forth, or any combination of these element types. The elements may optionally be translucent, ghost images, outlines, or have another see-through characteristic. Thus, at least part of the base image is visible through the secondary image(s).

When the cursor is moved, the secondary image, and thus the array of elements, moves over or along the static base image. The user may simply move, draw, or flick a finger, stylus, or other contact device across a touch-sensitive display to cause the array of the secondary image to move over the base image. Physics-based modelling may be utilized such that the speed of touch or flick varies the distance the array moves. Shake or tip control may be utilized in a computing device with accelerometer(s) 136; a small tip may cause the array of the second image to appear to start sliding over the base image. The array may be repeated or looped in one or more directions, such that the image appears to have no edge or end. The selected element may also be repeated.

During the set-up process, a preselected element present in the secondary image is aligned with the selected point of interest in the base image. For example, a user may click on a mouse or otherwise select to confirm.

The smaller the array or grid size, i.e., the closer the elements are located in the array, the higher the number of elements in the second image. More elements result in greater security, but the process may be more difficult for a user to quickly and easily locate a specific element. Where clicking a navigation device is inconvenient, e.g., with a touch-sensitive display, a timed dwell or hover for a period of time may be utilized as a confirmation. Software to prevent 'mine sweeping,' e.g., scanning back and forth slowly enough to trip the timed dwell or hover, may be implemented to improve security.

The set-up procedure may be performed directly on the computing device that includes an authentication mechanism. Once the set-up is complete, the user authenticates when accessing the computing device or specific functions/levels of access provided by the computing device. For example, a user of a PC or portable telephone may complete the above set-up procedure on that PC or portable telephone. In addition, the user may complete the above set-up procedure on one computing device, and that set-up may be applied to one or more other devices, such that the user goes through the set-up once, and all computing devices to which he may need access may share the same authentication set-up process. This process is particularly useful or appropriate for authentication required by organizations with multiple computing devices, for cloud-computing applications, for point-of-sale authentication, e.g., cash or ATM machines, when making purchases using credit or debit cards, to replace conventional chip and PIN systems, and so forth.

When a computing device begins to authenticate a user, e.g., when the device is unused for more than a pre-selected time, the same circumstances in which a conventional PIN or password entry are required, and so forth, the computing device displays the base image. The secondary image is displayed or called up. This secondary image display may be performed in a variety of ways. The secondary image may appear automatically, e.g., upon detection of depression of any key on a keyboard or movement of the navigation device, such as a mouse. For a touch-sensitive display, a detected touch on the display may cause the secondary image to be displayed or called-up. For a portable device such as a mobile or portable telephone, any wake-up method, such as a short shake or any of the above actions may call up the secondary image. Once the secondary image is displayed, the user may move the elements of the secondary image such that the pre-selected element in that secondary image sufficiently aligns over the pre-selected point of interest. Because the elements in the secondary image are part of a linked array of elements, moving one element causes all the elements to move. Thus, the user does not have to select, or apply a cursor or touch to, the pre selected element to move the array of the secondary image, i.e., any element or part of the secondary image, including transparent or translucent areas that may appear as empty space, may be selected or touched to move the secondary image. A cursor or touch anywhere in the secondary image moves the secondary image until, e.g., sufficient alignment between the pre-selected element in the secondary image and the point of interest in the base image results in authentication. An observer looking over the shoulder of the user will likely have no idea which element of the secondary image the user is aligning to which point of interest or authentication area/region of the base image.

Figure 1:
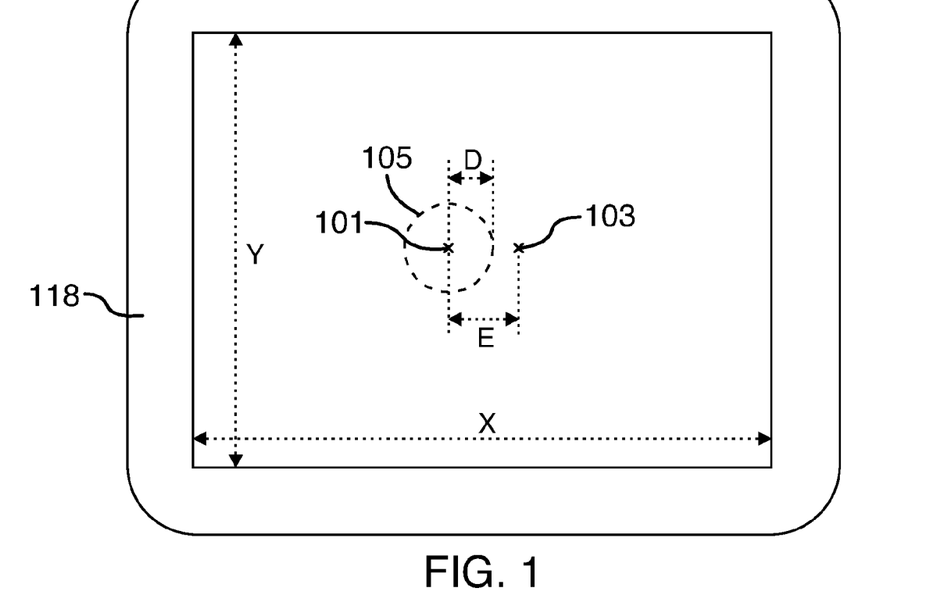
FIG. 1 shows an unsuccessful graphical authentication in accordance with the disclosure.

A display 118 of width X and height Y for a computing device 100 is shown in FIG. 1. The pre-selected point of interest 101 of the base image and the position of the pre-selected element 103 of the secondary image are shown. A successful authentication occurs when the pre-selected element in the secondary image sufficiently aligns over the pre-selected point of interest. Alignment sufficient for authentication occurs when the point of interest and the pre-selected element are located within a predetermined distance of each other or when the position of the pre-selected element is within a predetermined authentication area. In the example of FIG. 1, the authentication area 105 is a circle, having radius D, centered on the point of interest. In this example, D is the maximum distance from point of interest to element location for a successful authentication, such as a log in. E is the distance from the point of interest 101 to the position of the pre selected element 103 of the secondary image. Because distance E is greater than the distance D, authentication is not successful in this example. Although the authentication area is shown as a circle, a square, triangle, oval, or any other shape may be utilized.

In FIG. 1, the authentication is not successful because the alignment between the selected element of the secondary image and the point of interest in the base image is insufficiently accurate. The area of the circle 105 may be adjusted or changed by modifying the value of D. Modifying the size of the authentication area alters the percentage of the overall screen area (X*Y) that results in a successful authentication, such as a log-in attempt. When D is smaller, the element 103 of the secondary image is more accurately aligned to the point of interest 101 for successful authentication. When D is larger, the element 103 of the secondary image may be less accurately aligned to the point of interest 101 for successful authentication. The user may be provided with the ability to select the size of the authentication area associated with a point of interest, e.g., distance D.

Figure 2:
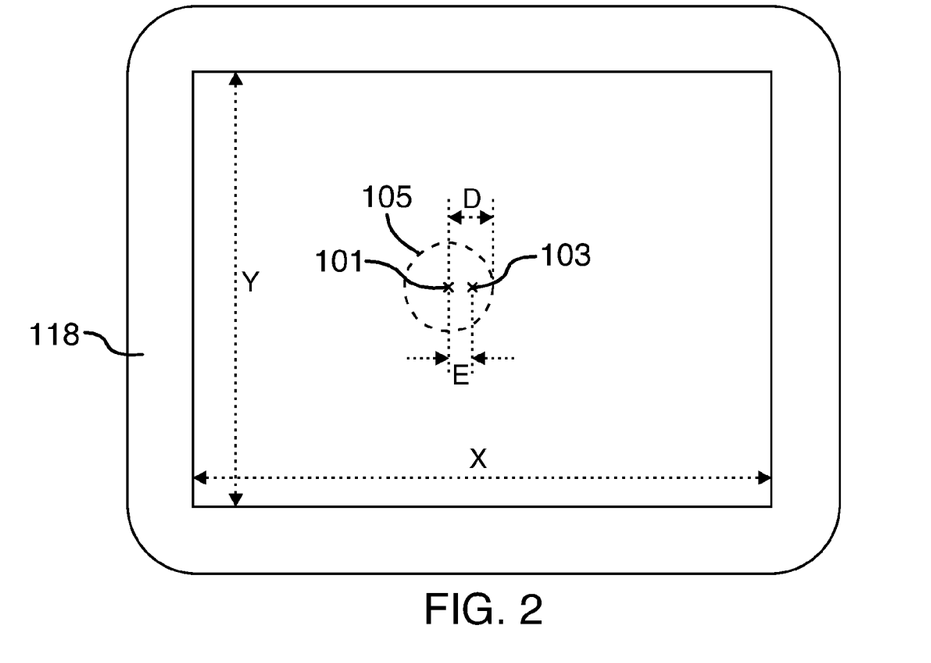
FIG. 2 shows a successful graphical authentication in accordance with the disclosure.

FIG. 2 shows a successful alignment, leading to authentication, e.g., access to the computing device, or confirmation of a sale when the device is a point of sale terminal, and so forth.

The graphical authentication process described herein has advantages over the following 6 ways of breaching a standard password or PIN.

Random trial and error, systematic trial and error. The security level may be, for example, the target area divided by the display area. A 2 mm target on a laptop screen may give about the same level of security as a 4 digit PIN number. When greater security is desired, two or more points of interest may be selected or aligned with the element of the secondary image in sequence. With two points of interest, security for each stage halves due to the authentication area of the two points of interest, but the 2-stage operation multiplies or increases the odds, hence increasing security theoretically to about 1 in 25 million for the laptop example. Over the shoulder security is different depending whether the two targets are on the base image or secondary image. Two points of interest on the base image and one element on the secondary image may be quickest to apply. Further security may be added by tracking the movement between both selections, or alignments, e.g., the vector/gesture/timing may be analyzed as a signature.

Inspired guesswork. Analysis of the base image may determine that, e.g., 100 possible points of interest are present and areas of no detail hence locally no points of interest. With 100 elements in the array of the secondary image, the security is 1 in 1000. In an analog system, many more than 100 points of interest are possible, because the user may target or select as a point of interest the edge of an object in the image, the boundary between objects, and so forth.

Learning the password by surveillance. When protection against someone looking over your shoulder is desired, the method may be adapted to excel in this area. As described above, the array may appear the same, thus anyone may look at the relationship between a fixed point on the base image, for example, the bottom left-hand corner, and the nearest element to that fixed point on the secondary layer, and repeat that action. When the layout of the array of the secondary image is changed, e.g., occasionally or up to every time, the secondary image is subsequently displayed, and this method of surveillance will not likely be successful. The changes include, for example, modifying the pitch of the array, the orientation or skew of the array, the order of the elements in the array, the shape of the array, and so forth, or any combination of these changes, giving potentially hundreds of randomly selected variations on the array. These changes may be designed to be subtle and appear similar to the user to avoid confusion.

Two simple, elements, the point of interest on the base image and the element of the secondary image may be easier to remember than a long password, and less reason to write it down. Because each image or layer acts as a prompt, the chances of choosing the wrong password are reduced. A written down reminder is likely to carry a level of ambiguity, e.g., "55 and the corner of Anne's mouth." Knowledge of only one of these elements reduces the level of security in the above example to about 1 in 100, which is a worthwhile hindrance.

Hacking. The use of an analog navigation device such as a mouse, trackball, touchscreen, and so forth, to enter the password renders hacking programs, such as key stroke grabbers and other such technology, incapable of intercepting or making use of the user's authentication details. While the mouse may indeed be tracked, due to the random generation of numbers in the array of the secondary image, tracking the trajectory of the mouse would not elicit the user's password, e.g., the point of interest and selected element.

On-line security, for example, may be further enhanced through use of the combination of hexadecimal information available from each of the images or layers for use as the authentication key. Generally, an authentication key may comprise information from the secondary image and the base image. The information from the base image may be stored in a location physically remote from the information from the secondary image, e.g., on a network server. Rather than utilizing a simple set of numbers, e.g., the pixel point on the display and x, y coordinate of the image, although an option, the system may merge the binary information from the array of the secondary image with the base image that is utilized to render the image, resulting in a byte code sequence many hundreds of times longer than an average user password. This byte code sequence, rather than a set of letters and/or numbers, may be utilized to authenticate the user with the server system. Due to the length of the sequence, this sequence would therefore be far more difficult to interpret or hack than a typical user-entered password.

The information for rendering the separate layers, e.g., the array of the secondary image and the base image, may reside in different locations, e.g., the user's picture can be secured and rendered from information within their credit card or mobile phone, while the specific elements required to generate the particular array for that user can be held on a server system, or generated by the ATM. This segregation of the key elements required to generate the authentication key adds a further level of security by preventing third party access to both elements simultaneously, at least without the item containing the user's original image.

Forced disclosure to a mugger. Graphical authentication as described herein offers a potential mugging victim the opportunity to mislead a mugger by describing or demonstrating a false alignment during authentication. The user may select any part of the secondary image to move the image into the correct alignment for authentication. During a mugging attempt, the user may move the secondary image by selecting a "fake" element, i.e., an element other than the pre selected element, to move the secondary image. When the pre-selected element is aligned with the point of interest, the fake element is aligned with a location that is not the point of interest. Later, when the mugger aligns the fake element with the location that is not the point of interest, authentication will not result because of the random array change, i.e., change in arrangement or ordering of the elements of the secondary image.

A trade-off between the ease of locating the pre-selected element of the secondary image and security resulting from the number of elements, i.e., more elements are more secure, but finding the pre-selected element is more difficult. This trade-off is compounded when the array is randomly modified, e.g., when the arrangement or ordering of the array changes each time the secondary image is displayed. Finding the preselected element, e.g., the number 55 in a 10×10 grid of 100 numerals, is easier when arranging the numbers in sequence. This arrangement works well for elements with well-known sequences, such as numbers and letters.

Another benefit is that the base and secondary images may be graphically tailored to suit different users or preferences. For example, the secondary image for a child's may consist of an arrangement of colored shapes. To facilitate ease of finding the pre-selected element, the two variables, e.g., color and shape, may be arranged horizontally and vertically, e.g., the green triangle may always be located at the intersection of the green line and the triangle line. Three variables may provide a hexagon-like array. To prevent copying, e.g., memorizing of the arrangement by an unauthorized person or thing, the order of the colors and shapes may change substantially each time the second image subsequently appears. Additionally or alternatively, the pitch, orientation, skew, and so forth may also be modified.

A range of base images and points of interest/authentication areas provide the user with a number of easy-to-remember graphical passwords for different aspects of their life, e.g., work/home portable phone, laptop, on-line banking, on-line transactions, and so forth. The same pre-selected element of the second image may be utilized by a user on multiple computing devices. Alternatively different arrays of elements may be utilized on different computing devices. For example, an image of the user's family overlaid with an array of colored shapes is a visual prompt to line up, e.g., the green triangle with sister Anne's mouth.

After authentication is denied, at least one more attempt to authenticate is typically allowed. Utilizing exactly the same array from the failed authentication may be utilized on the next attempt, rather than randomly setting a new array. Subsequent authentication may be faster for a user who was careless with the previous alignment. When access is denied a given number of times, the user may be locked out, e.g., for a period of time or until an override process is performed. Many different ways to override the lock out are known, depending on the equipment or service that is protected. The first lock out may be soft, such that some functionality remains, giving options to rectify the situation.

A way of increasing the security is to provide more multiple authentication processes or stages before authenticating a user. After successful passing of a first authentication by aligning a first point of interest of a first base image with a first pre-selected element of a second image, a second base image and secondary image are displayed until successfully aligned, and so on until the required number of authentication stages is successfully achieved. Multiple authentication stages may be especially advantageously utilized to increase security for smaller displays that are more difficult to secure with a single authentication process. Optionally, two or more points of interest and/or two or more elements of the secondary image may be selected for authentication. For example, successful authentication may result from successful alignment of a single element of the secondary image with one or more points of interest of the base image. In another example, authentication may result from successful alignment of a two or more elements of the secondary image with one or more points of interest of the base image.

Figure 3:
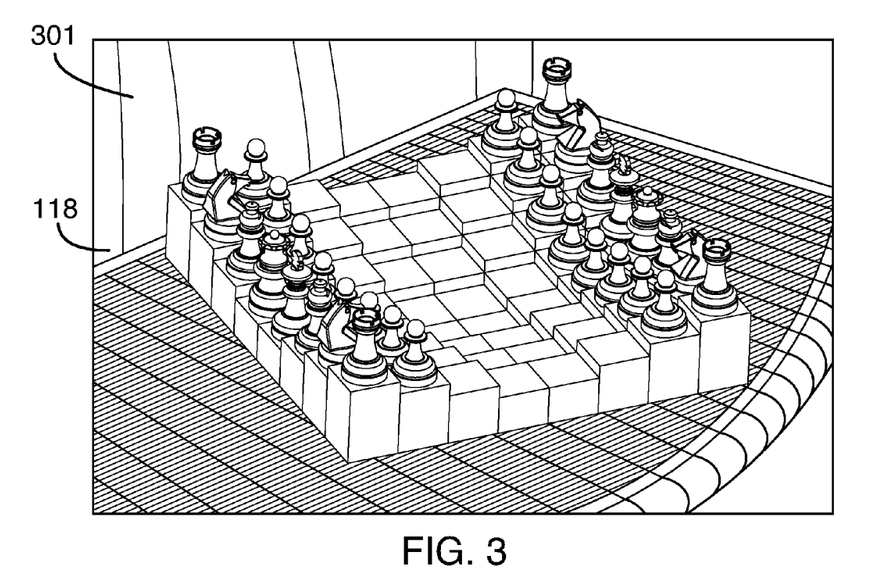
FIG. 3 shows a base image for graphical authentication in accordance with the disclosure.

Initial access may be granted with a lesser level of security, e.g., a single authentication stage to unlock a device, and multiple authentication stages may provide a greater level of security for accessing certain areas of a device that require greater security, e.g., banking, email access, and so forth, or for an enterprise environment to ensure an adequate level of security. For example, a single authentication stage may unlock a device and access certain functions, such as making a call or browsing the web, but to make a payment or access company emails, two or more authentication stages may be established before granting access. The order in which subsequent multiple authentication stages appear may be random. An implementation is described with reference to FIG. 3 through FIG. 10. To set up graphical authentication, a base image is entered in the computing device 100, e.g., when a user selects any image, such as a photograph, as the base image, such as shown in FIG. 3. This base image may be the user's desktop or home screen that appears by default each time the user starts a work session or attempts access, e.g., by entering their user name or switching on the device.

Figure 4:
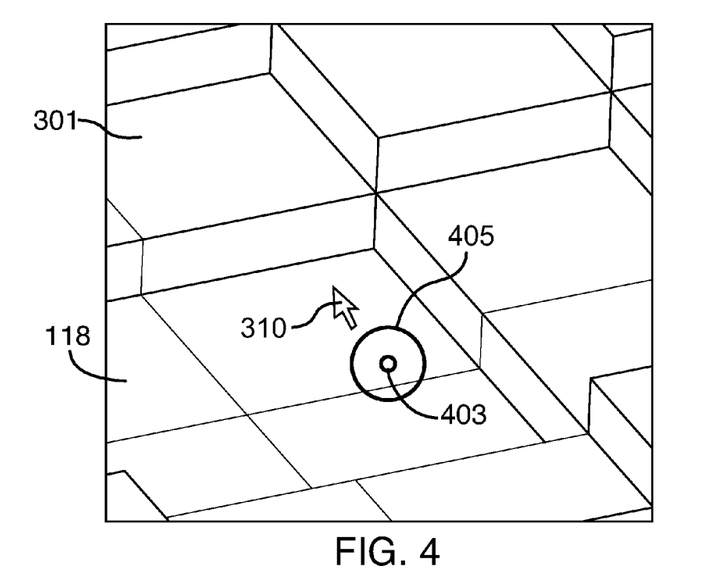
FIG. 4 shows a point of interest in the base image and associated circular authentication area during graphical authentication set-up in accordance with the disclosure.

A point-of-interest cursor 310, in conjunction with a point-of-interest indicator 403 and an authentication area indicator 405 is displayed, such as shown in the example of FIG. 4 in a default central position, to facilitate entry of a point of interest. Movement of the cursor 310 moves the indicators 403, 405. The point of-interest cursor 301 and indicators 403, 405 may be displayed automatically once the base image 301 is displayed or upon detection of a trigger, such as depression of a key on a keyboard, selecting a displayed selection item or button, touching a touch-sensitive display, and so forth.

Figure 5:
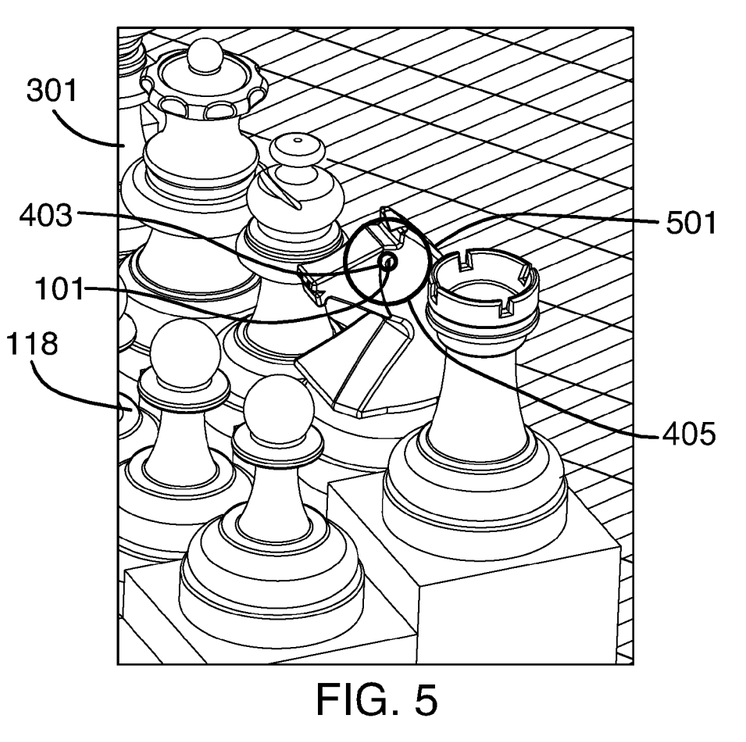
FIG. 5 shows selection of the point of interest during graphical authentication set-up in accordance with the disclosure.

The user may be prompted to select a point of interest anywhere on the base image 301. The point of interest 101 is identified at the location of the point-of-interest indicator 403 by the computing device 100 when a selection is detected when the point-of-interest cursor 310 is active. In this example, the eye of the white knight chess piece 501 is selected as the point of interest 101, as shown in FIG. 5 when the point-of-interest indicator 403 is located on the eye when selection is detected. Detection of selection includes, for example, detecting a mouse click, "enter" key depression, selection by any navigation device, single or double tap, hover, swipe, or other touch-sensitive display gesture, and so forth.

The authentication area indicator 405 may be adjusted in size to suit different display resolutions and/or sizes, desired security level, user preferences, and so forth. The smaller the size of the authentication area indicator 405, the more secure the method is.

Figure 6:
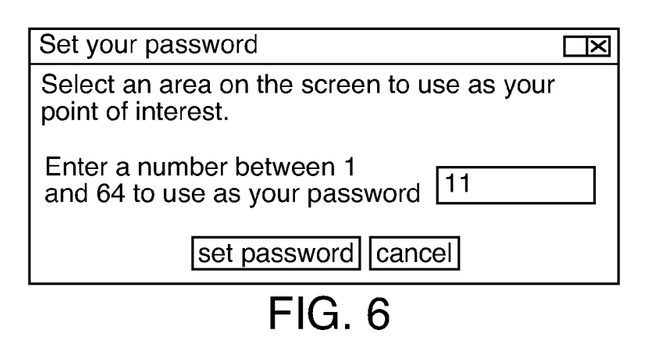
FIG. 6 shows selection of an element for a secondary image in the form of a number in accordance with the disclosure.
Figure 7:
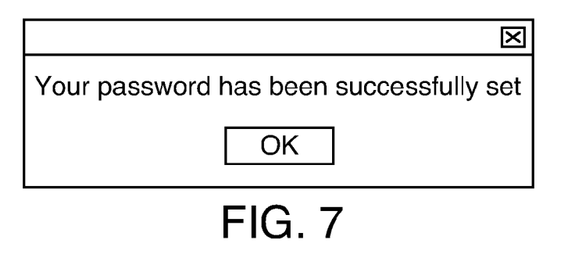
FIG. 7 shows a confirmation screen illustrating successful authentication set-up in accordance with the disclosure.

The computing device 100 prompts the user to select an element of a secondary image. In the example of FIG. 6, an integer number between 1 and 64 is requested because the elements of the secondary image 801 comprise the integer numbers 1 through 64 in the example of FIG. 8. The elements of the secondary image may comprise any characters, such as letters, numbers, alphanumerical sequences, symbols, shapes, or any combination thereof. In this example, the user has chosen the number 11. A confirmation screen, such as shown in the example of FIG. 7, is advantageously displayed after the element is selected for the graphical password. The point of interest, associated authentication area, and pre-selected element are stored in the computing device 100, for example, in a user profile. Each user profile may include multiple sets of points of interest, associated authentication areas, and pre-selected elements. Multiple user profiles may be stored in each computing device 100. Graphical authentication set-up is completed.

Figure 8:
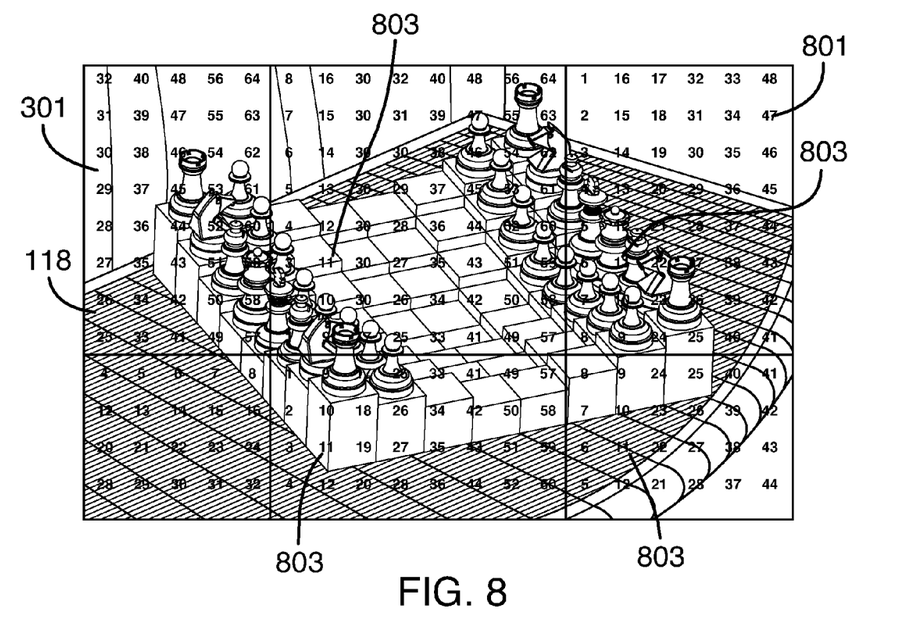
FIG. 8 shows the base image overlaid by the secondary image in accordance with the disclosure.
Figure 9:
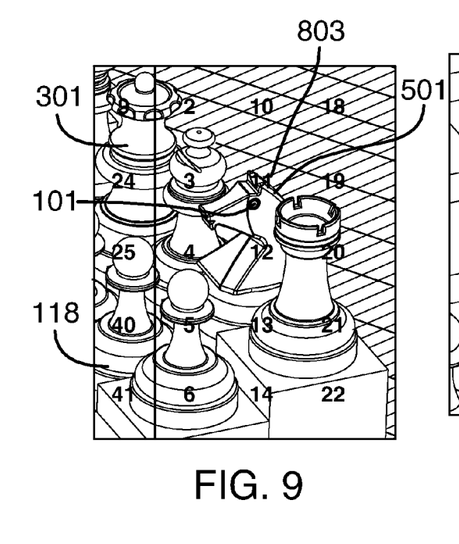
FIG. 9 shows authentication by aligning an element of the secondary image with the point of interest of the base image in accordance with the disclosure.
Figure 10:
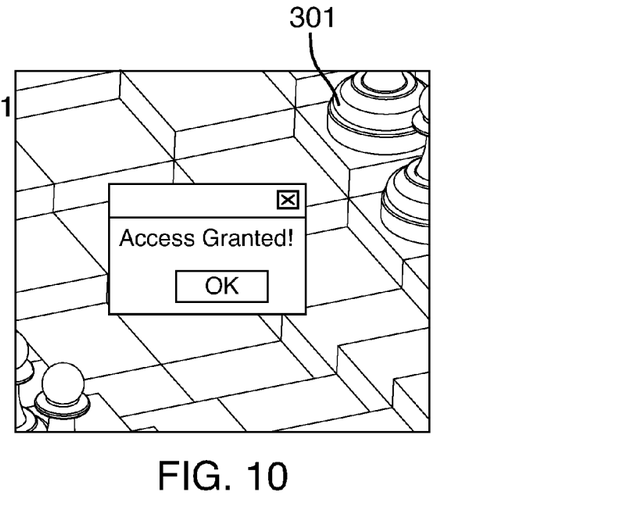
FIG. 10 shows a screen confirming successful authentication in accordance with the disclosure.

During authentication, the secondary image 801 appears overlaid on the base image 301, as shown in FIG. 8. In the example illustrated in FIG. 8, the secondary image is a repeating series of arrays in form of grids, each grid containing randomly generated alphanumeric characters that comprise nine grids each displaying the integer numerals 1 through 64 in a variation of sequences in each grid. Multiple instances of the user's pre-selected element "11" 803 are shown. The arrays of the secondary image 801 may be moved along the base image 301, e.g., by moving a cursor, touch movement, and so forth. The point of interest, the eye of the white knight, 101 is shown sufficiently aligned with the pre selected element "11", as shown in FIG. 9. When selection of the alignment is detected by the computing device 100, e.g., when the "enter" key is pressed, touch selection is entered, or any other form of confirmation is detected, the computing device 100 identifies whether the aligned elements 101 and 803 are stored for a user profile. When the pair of elements is confirmed for any user, alignment is detected, and the computing device 100 authenticates the user profile, also referred to as authenticating the user. Authentication confirmation may be displayed, such as shown in FIG. 10.

The method may be carried out by software executed, for example, by a processor 102 of the computing device 100. Coding of software for carrying out such a method is within the scope of a person of ordinary skill in the art given the present description. The method may contain additional or fewer processes than shown and/or described, and may be performed in a different order. Computer readable code executable by at least one processor of the computing device 100 to perform the method may be stored in a computer-readable medium.

Image operations other than movement of the secondary image may take place during selection of the point of interest 101 or during authentication. For example, image operations such as panning, scrolling, zooming in, zooming out, and so forth may be performed, e.g., on the base image 301, to aid selection of the point of interest 101 or aligning the pre-selected element 803 with the point of interest 101. Such image operations may be advantageous, for example, for devices 100 with smaller displays 118, such as cellular phones, smart phones, or PDAs.

Figure 11:
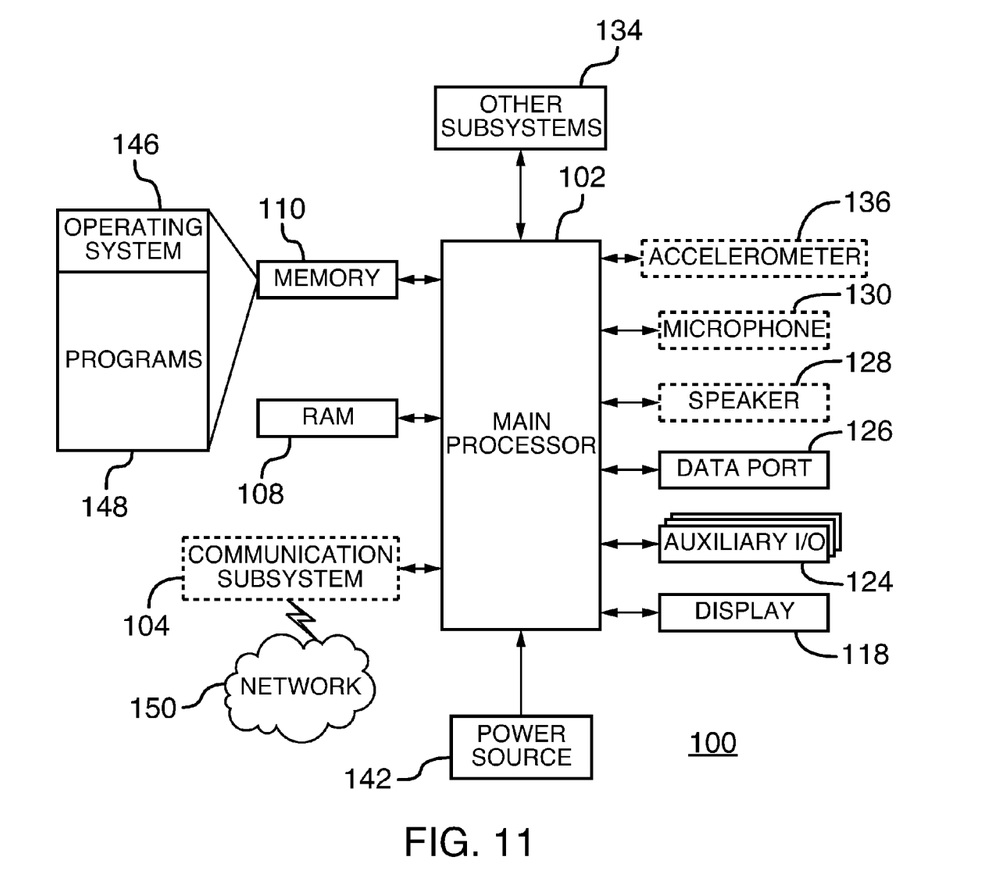
FIG. 11 shows a block diagram of a computing device in accordance with the disclosure.

A block diagram of an example of a computing device 100, which is shown as a portable electronic device in this example, is shown in FIG. 11. The computing device 100 includes multiple components, such as a processor 102 that controls the overall operation of the computing device 100. Communication functions, including data and voice communications, are performed through a communication subsystem 104 that communicates with a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the computing device 100.

The processor 102 interacts with other components, such as Random Access Memory (RAM) 108, memory 110, a display 118, which may optionally be a touch-sensitive display comprising a touch-sensitive overlay operably coupled to an electronic controller, one or more auxiliary input/output (I/O) subsystems 124 including, e.g., navigation devices, a data port 126, a speaker 128, a microphone 130, and other device subsystems 134 known in the art. Information, such as text, characters, symbols, images, icons, and other items that may be displayed or rendered on the computing device 100, is displayed on the display 118 via the processor 102. The processor 102 may interact with an accelerometer 136 that may be utilized to detect direction of gravitational forces or gravity-induced reaction forces. User identification information may be stored in memory 110. The computing device 100 includes an operating system 146 and software programs or components 148 that are executed by the processor 102 and are typically stored in a persistent, updatable store such as the memory 110. Additional applications or programs may be loaded onto the computing device 100 through the wireless network 150, the auxiliary I/O subsystem 124, the data port 126, or any other suitable subsystem 134.

This graphical authentication method may be provided for any electronic device or system that has a display, such as a digital display, for example, personal computers, personal information managers, cellular telephones, automated teller machines, security access systems, and so forth.

The method includes, during set-up, identification of two or more image elements, e.g., a point of interest in a base image and an element from a secondary image. During an access or authentication request, alignment of the pre-selected element with the specific point of interest results in authentication. For example, the base image may comprise a random arrangement of small images of cars. A particular car is identified as the point of interest during set-up. The secondary image may comprise a random arrangement of images of motor bikes, for example, one of which is pre-selected during set-up. When further authentication is subsequently applied, the base image of cars and the secondary image of motor bikes is displayed. The user moves the array of motor bike images until alignment between the pre-selected car and motor bike occurs and selects the alignment. When the pre-selected motor bike image is sufficiently aligned over the car image previously identified as the point of interest, authentication occurs and access is granted. Any choice of suitable images may be utilized for the base and secondary images.

More than two layers of images may be utilized for enhanced security. For example, when N images are overlaid, authentication includes alignment of N elements, one from each image, which N elements may be aligned simultaneously or sequentially. For example, during set-up, an image of a car, a motor bike, and a lady's face may be the pre-selected elements. When authentication is requested, an image of multiple faces is displayed, overlaid with an image of multiple cars. When the correct alignment of pre-selected car and face is detected, a further image of motor bikes is displayed over one or more of the other images, e.g., the faces and/or the cars. When the correct alignment of the pre-selected motor bike with the pre-selected car and/or face is detected, authentication is complete. The elements of the images do not need to appear in the same order each time the image is displayed, e.g., the location of the different faces may be different each time the image is displayed. Advantageously, when the area associated with each image in an image or layer is a sufficiently small percentage of the overall display size, security is higher when a brute-force attack is at least as challenging as in a conventional PIN or password based system. A graphical authentication process is far more enjoyable to the user.

A fast and easy method to authenticate a user to the computing device is provided that is more secure than many conventional password and PIN based authentication systems. The method may be utilized anywhere passwords, PINs and other simple authentication systems are utilized for authentication, such as log ins or other access to computing devices, such as cellular telephones, smart telephones, PDAs, PCs, laptop computers, personal information managers, ATMs, point of sale terminals, security access systems, other electronic devices, and so forth, on-line banking and transactions, ATM and chip and PIN credit and debit card security, and so forth.

Improved security is provided by making surveillance by an observer difficult to learn the key. Ease and acceptance of use is facilitated. Easy to remember graphical passwords may be utilized for access to multiple different devices, such as work/home portable phones, laptops, on-line banking, on-line transactions, and so forth.

A computing device comprises a graphical authentication interface in which the device displays a base image and a user, in order to authenticate, aligns a pre-selected element present in a secondary image layer overlying the base image with a pre-selected element in the base image. The selected element in the base image may be a point of interest in a fixed location in the base image. The user may identify the point of interest in the base image by touching it or selecting it with a cursor. The point of interest may have an associated, surrounding region and the size of the surrounding region may be user-selected. Software running on the computing device may analyse a picture for suitability as a base image. The secondary image layer may include user-identifiable elements that are numbers, letters words, colours, shapes, lines, icons, or any combination thereof. The secondary image layer may be transparent or translucent except for an array of user-identifiable elements arranged in a pattern or grid. The pattern or grid may be regular. The whole pattern or grid may be made to move over the static base picture to enable the user to align correctly. Physics-based modelling may be used such that the speed of a touch flick varies the distance the pattern or grid moves. Shake or tip control may be used to control the way in which the pattern or grid moves. The pattern or grid may be repeated or looped in all directions so that there is no edge to it. The layout of the pattern or grid may be changed every time it appears. The change may be to the pitch of the pattern or grid, the orientation or skew of the pattern or grid, the order of the elements in the pattern or grid, the shape of the pattern or grid, or any combination of these. Two or more points of interest in the base image may be successively aligned to. The same element in the secondary image layer may be aligned to each of the multiple points of interest in the base image. The combination of hexadecimal information associated with the pre-selected elements in the base image and the secondary image layer may be used as an authentication key. An authentication key may be generated using information associated with the pre-selected element in the base image and information associated with the pre-selected element in the secondary image layer; and each item of information is held in physically remote devices. The choice of elements in the base image and the secondary image layer may be tailored to suit different users or their preferences. After one secondary image layer appears and the user successfully aligns, a further secondary image layer may appear and the user aligns a pre-selected element present in this further secondary image layer with a pre-selected element in the base image. Three or more secondary image layers may be used. The number of secondary image layers may vary depending on the level of security required. The pre-selected element in the base image may be a type of element that does not have a fixed position in the base image but that can appear anywhere in the base image. The computing device may be any of the following group: personal computers, personal information managers, cellular telephones, automated teller machines, security access systems, point of sale terminals.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   displaying a first image and a second image overlaying the first image on a display, the first image having a plurality of points of interest and the second image having a plurality of user-identifiable elements;
   detecting a substantial alignment of a point of interest in the first image with a first element of the second image in response to user input for movement of the second image; and
   when the point of interest and the first element are a selected point of interest and a selected element for a user, authenticating the user.

2. The method of claim 1, wherein the point of interest is substantially aligned with the first element when a location of the first element is located in an authentication area associated with the point of interest.

3. The method of claim 1, wherein an adjustable authentication area is associated with the point of interest.

4. The method of claim 3, wherein at least one of the size and shape of the authentication area is adjustable.

5. The method of claim 3, wherein the authentication area is adjustable by user entry.

6. The method of claim 3, wherein the authentication area is adjustable based on one or more characteristics of any one or more of the following: the first image, the second image, and the display.

7. The method of claim 1, wherein the point of interest is detected as substantially aligned with the first element when a location of the point of interest is located within a threshold distance of the first element.

8. The method of claim 1, wherein the first image or second image is partially transparent such that at least part of the first image or second image is visible through the other of the first image or second image.

9. The method of claim 1, further comprising:
   displaying a third image overlaying at least one of the first image and the second image, the third image having a plurality of user-identifiable elements including a second element; and
   authenticating the user when the point of interest in the first image, the first element in the second image, and the second element of the third image are detected as being substantially aligned with each other.

10. The method of claim 1, wherein the second image is comprised of an array of elements.

11. The method of claim 10, wherein the array is repeated or looped in one or more directions.

12. The method of claim 1, further comprising displaying a different arrangement of elements of the second image when the second image is subsequently displayed.

13. The method of claim 12, wherein the different arrangement is randomly generated.

14. The method of claim 1, further comprising at least one of re-sizing, re-positioning, and re-arranging at least part of the first image when the first image is subsequently displayed.

15. The method of claim 1, further comprising multiple authentication stages.

16. The method of claim 1, wherein a combination of information associated with the selected point of interest and the selected element for a user is at least part of an authentication key.

17. The method of claim 1, further comprising providing an authentication key comprising information from the second image and the first image.

18. The method of claim 17, wherein the information from the first image is stored in a location physically remote from the information from the second image.

19. The method of claim 1, further comprising:
   detecting substantial alignment of aligning at least one selected element of the second image to two or more points of interest in the first image.

20. The method of claim 1, wherein the point of interest is in a fixed location in the first image.

21. The method of claim 1 wherein the first image comprises a photograph and the second image comprises an array of the user-identifiable elements.

22. The method of claim 1 wherein the first image comprises a photograph imported from a photo library.

23. The method of claim 1, wherein authenticating the user allows access to a computing device.

24. A non-transitory computer-readable medium having computer-readable instructions stored thereon for execution by at least one processor of a computing device, which when executed direct the computing device to:
    display a first image and a second image overlaying the first image on a display, the first image having a plurality of points of interest and the second image having a plurality of user-identifiable elements;
    detect a substantial alignment of a point of interest in the first image with a first element of the second image in response to user input for movement of the second image; and
    when the point of interest and the first element are a selected point of interest and a selected element for a user, authenticate the user.

25. The non-transitory computer-readable medium of claim 24, wherein authenticating the user allows access to a computing device.

26. The non-transitory computer-readable medium of claim 24, wherein the point of interest is substantially aligned with the first element when a location of the first element is located in an authentication area associated with the point of interest.

27. The non-transitory computer-readable medium of claim 24, wherein an adjustable authentication area is associated with the point of interest.

28. The non-transitory computer-readable medium of claim 24, wherein the point of interest is detected as substantially aligned with the first element when a location of the point of interest is located within a threshold distance of the first element.

29. The non-transitory computer-readable medium of claim 24, wherein the first image or second image is partially transparent such that at least part of the first image or second image is visible through the other of the first image or second image.

30. The non-transitory computer-readable medium of claim 24, wherein the computer readable instructions direct the computing device to:
    display a third image overlaying at least one of the first image and the second image, the third image having a plurality of user-identifiable elements including a second element; and
    authenticate the user when the point of interest in the first image, the first element in the second image, and the second element of the third image are detected as being substantially aligned with each other.

31. A computing device comprising:
    at least one processor;
    a display; and
    a non-transitory computer readable medium having computer readable instructions stored thereon that when executed by the processor direct the computing device to:
        display a first image and a second image overlaying the first image on the display, the first image having a plurality of points of interest and the second image having a plurality of user-identifiable elements;
    detect a substantial alignment of a point of interest in the first image with a first element of the second image in response to user input for movement of the second image; and
    when the point of interest and the first element are a selected point of interest and a selected element for a user, authenticate the user.

32. The computing device of claim 31, wherein authenticating the user allows access to a computing device.

33. The computing device of claim 31, wherein the point of interest is substantially aligned with the first element when a location of the first element is located in an authentication area associated with the point of interest.

34. The computing device of claim 31, wherein an adjustable authentication area is associated with the point of interest.

35. The computing device of claim 31, wherein the point of interest is detected as substantially aligned with the first element when a location of the point of interest is located within a threshold distance of the first element.

36. The computing device of claim 31, wherein the first image or second image is partially transparent such that at least part of the first image or second image is visible through the other of the first image or second image.

37. The computing device of claim 31, wherein the computer readable instructions direct the computing device to:
    display a third image overlaying at least one of the first image and the second image, the third image having a plurality of user-identifiable elements including a second element; and
    authenticate the user when the point of interest in the first image, the first element in the second image, and the second element of the third image are detected as being substantially aligned with each other.

38. A method comprising:
    displaying a first image, second image and third image, the second image and third image overlaying the first image on a display, the first image having at least one point of interest, the second image having a plurality of user-identifiable elements, and the third image having a plurality of user-identifiable elements;
    detecting a substantial alignment of the at least one point of interest in the first image, a first element of the second image, and a second element of the third image; and
    when the at least one point of interest in the first image, the first element of the second image, and the second element of the third image are a selected point of interest and selected elements for a user, authenticating the user.

39. The method of claim 38, wherein authenticating the user allows access to a computing device.

* * * * *